INVENTOR.
John B. Kraeling

June 25, 1963 J. B. KRAELING 3,095,057
TRAVELING BLOCK WEIGHING DEVICE
Filed Jan. 11, 1961 6 Sheets-Sheet 3

INVENTOR.
JOHN B. KRAELING
BY
*William D. Carothers*
HIS ATTORNEY

INVENTOR.
JOHN B. KRAELING
BY
William D. Carothers
HIS ATTORNEY

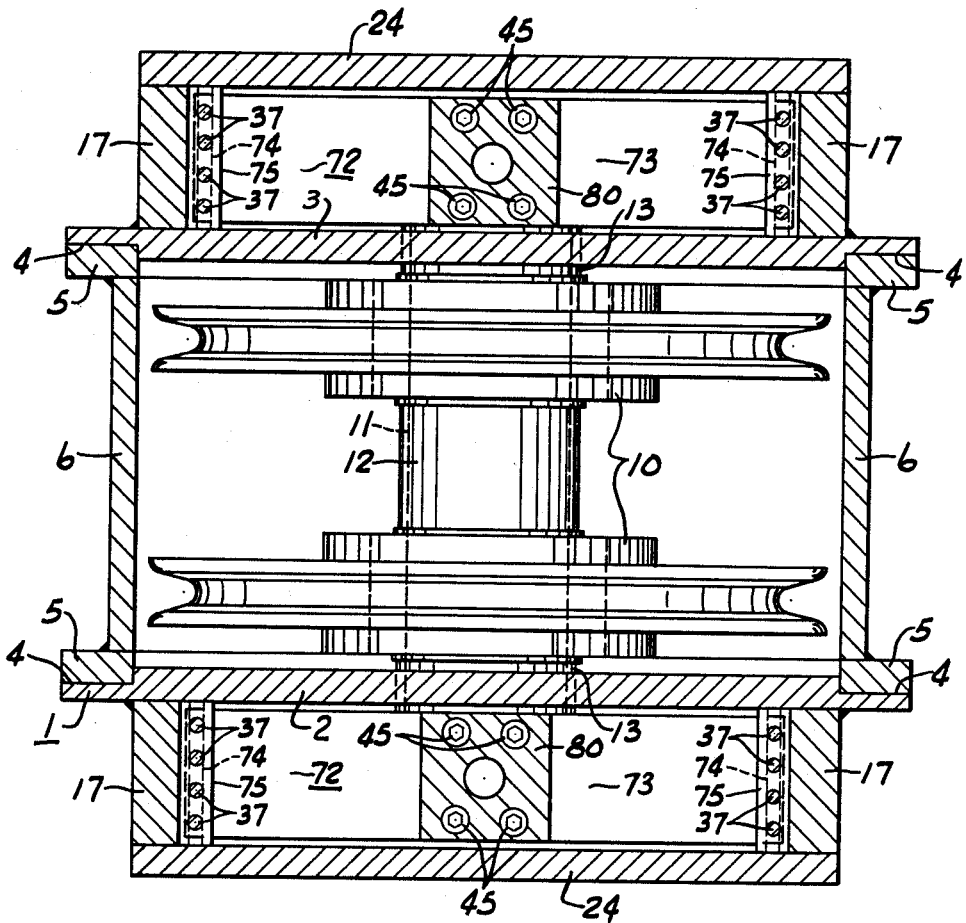

United States Patent Office 3,095,057
Patented June 25, 1963

3,095,057
TRAVELING BLOCK WEIGHING DEVICE
John B. Kraeling, Meadville, Pa., assignor to Drafto Corporation, Cochranton, Pa., a corporation of Pennsylvania
Filed Jan. 11, 1961, Ser. No. 82,119
9 Claims. (Cl. 177—147)

This invention relates generally to traveling block weighing device and more particularly to the manner of suspending the load on the load cell.

Any movement transversely of the load suspended on a load cell that is effective in creating lateral forces directly on the load cell button is apt to completely destroy the cell or cause it to radically change its calibration or to become completely erratic in its computation thereby rendering the cell useless. Cells of this nature cost considerably and a heavy load on a crane traveling block is not always handled with deftness. Yet it is important for the craneman to know the load and handle it accordingly.

The important object of this invention is the provision of a traveling block that suspends the load from a weighing device in such a manner that sudden movement or arrest of the load will not injure the load cell.

Another object is the provision of a suspension beam structure that prevents lateral movement on the load suspension button of the load cell.

Another object is the provision of single or double beam structure to suspend the load from a button on a load cell. The single or double beam strutcures are mounted on each side of the traveling block. The single beam may be constructed to be aligned with the center of the sheave pin whereas the double beam structure engages both the top and bottom of the sheave pin with the beams at each end of the sheave pin. The single and each of the double beam structures may be constructed as single integral member. The double beam member may also be constructed as a plurality of springs fabricated as a unit and secured at its center to the sheave pin and at their ends to the traveling block housing.

Another object is the provision of a traveling block weighing device having a hook with a universal suspension.

Another object is the provision of a traveling block weighing device having a rotatably supported hook beam carrying a rotatably supported stem provided with a clevis carrying a hook pin with a hook journaled thereon.

Another object is the provision of a traveling block weighing device having a housing with spaced plates interconnected by an annular sheave guard recessed in said plates and secured thereto. The plates having wide clearance openings for the sheave pin and also carrying the beam means to support the sheave pin under the buttons of a load cell mounted on each plate.

Other objects and advantages of this invention appear in the following description and claims.

The accompanying drawings show for the purpose of exemplification without limiting the invention or claims thereto certain practical embodiments of the invention wherein:

FIG. 6 is a view in horizontal section taken on the line 6—6 of FIG. 5.

Figure 1:
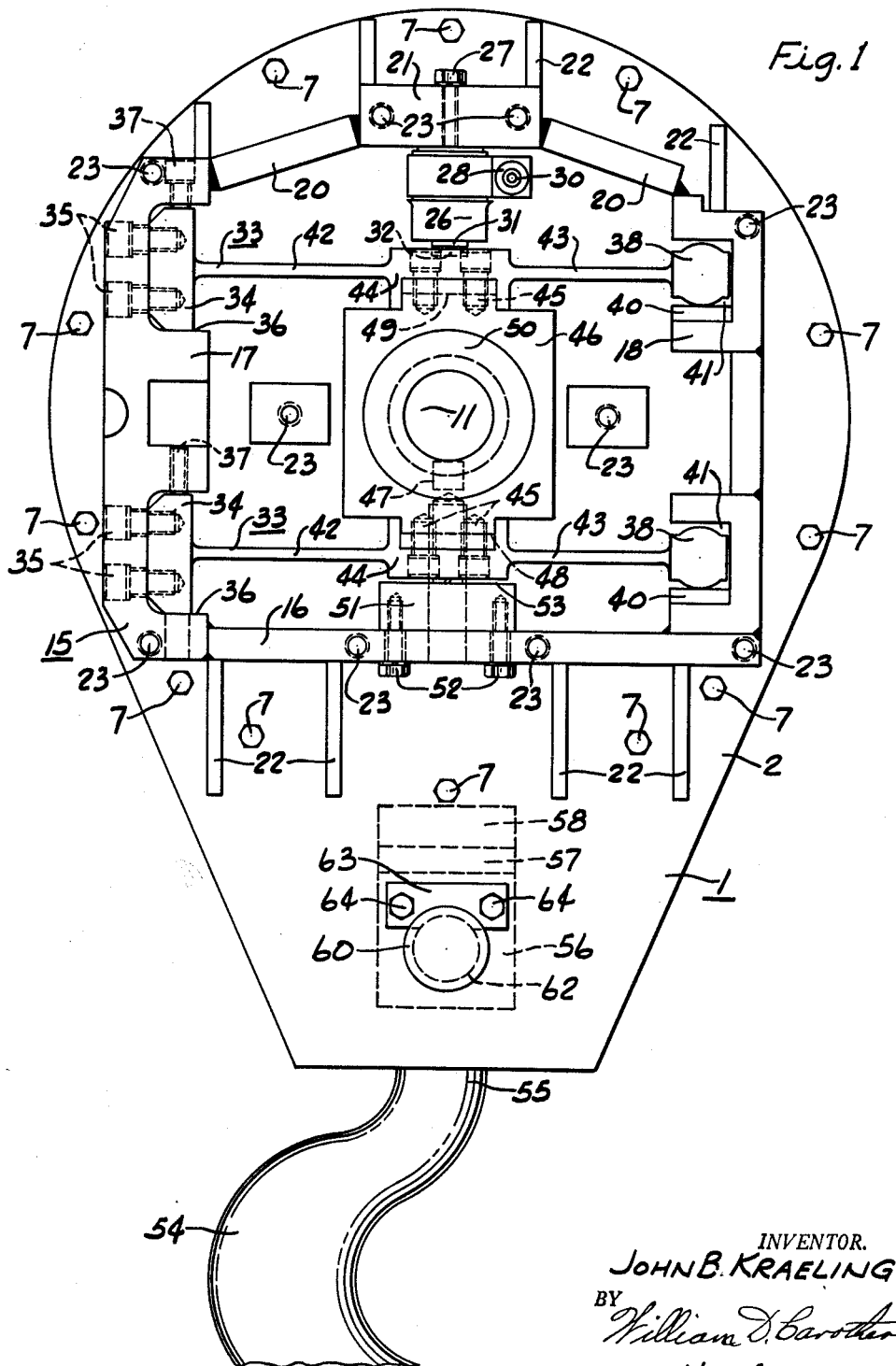
FIG. 1 is a view in side elevation of the traveling block comprising this invention with the cover plate removed.
Figure 2:
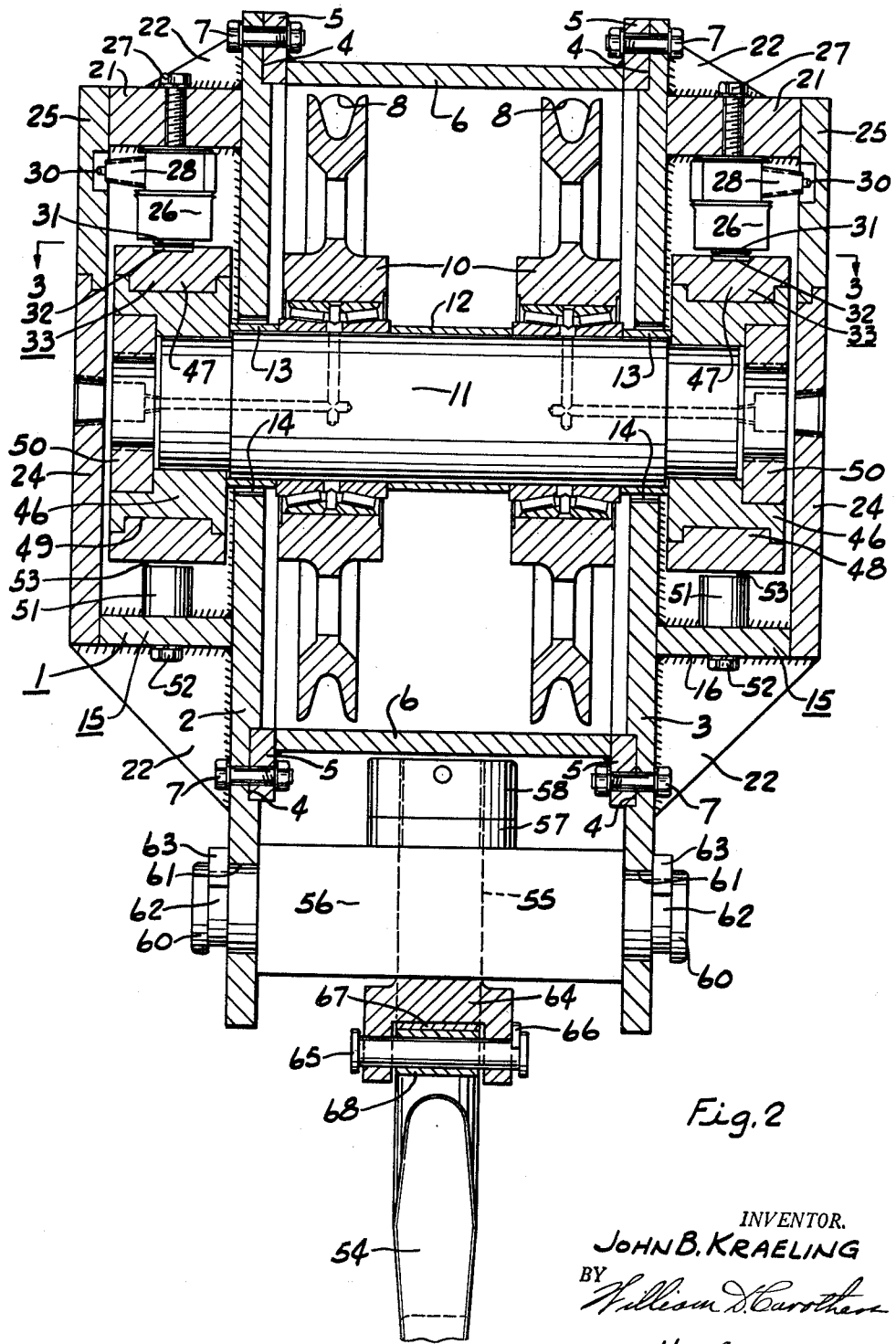
FIG. 2 is a view in vertical section of the traveling block comprising this invention.
Figure 3:
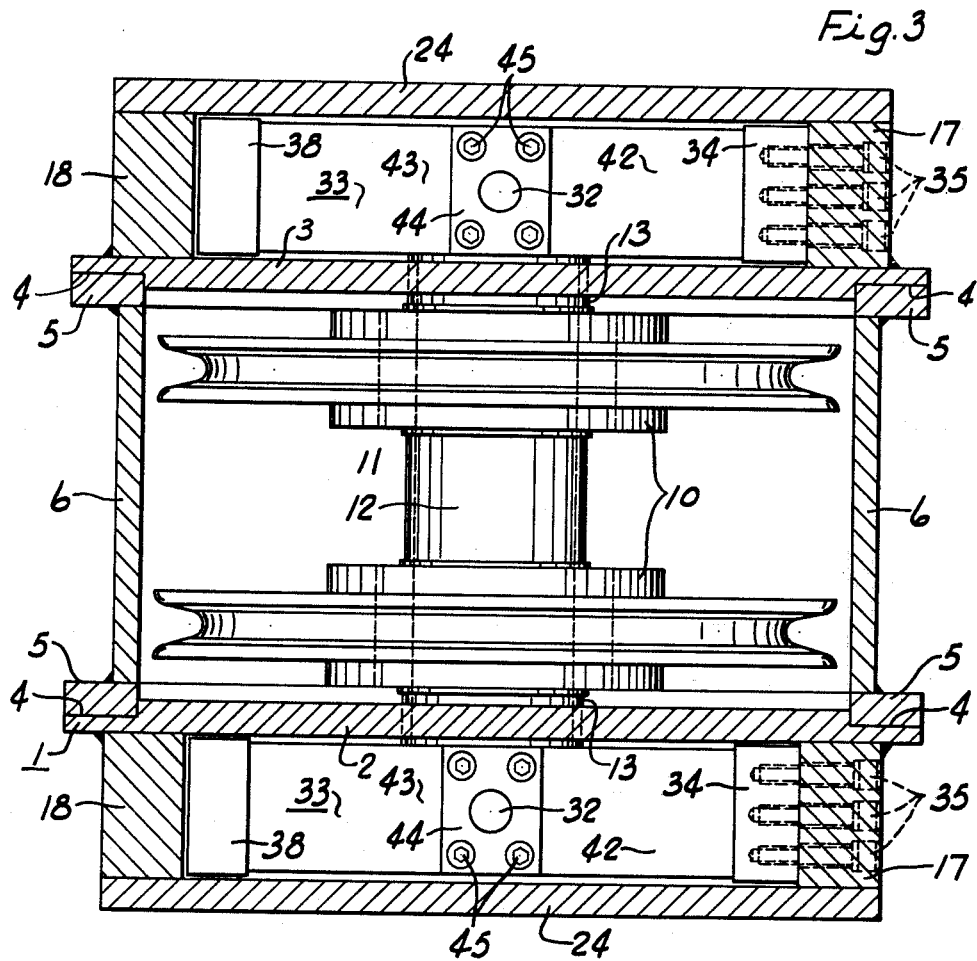
FIG. 3 is a view in horizontal section taken on the line 3—3 of FIG. 2.
Figure 4:
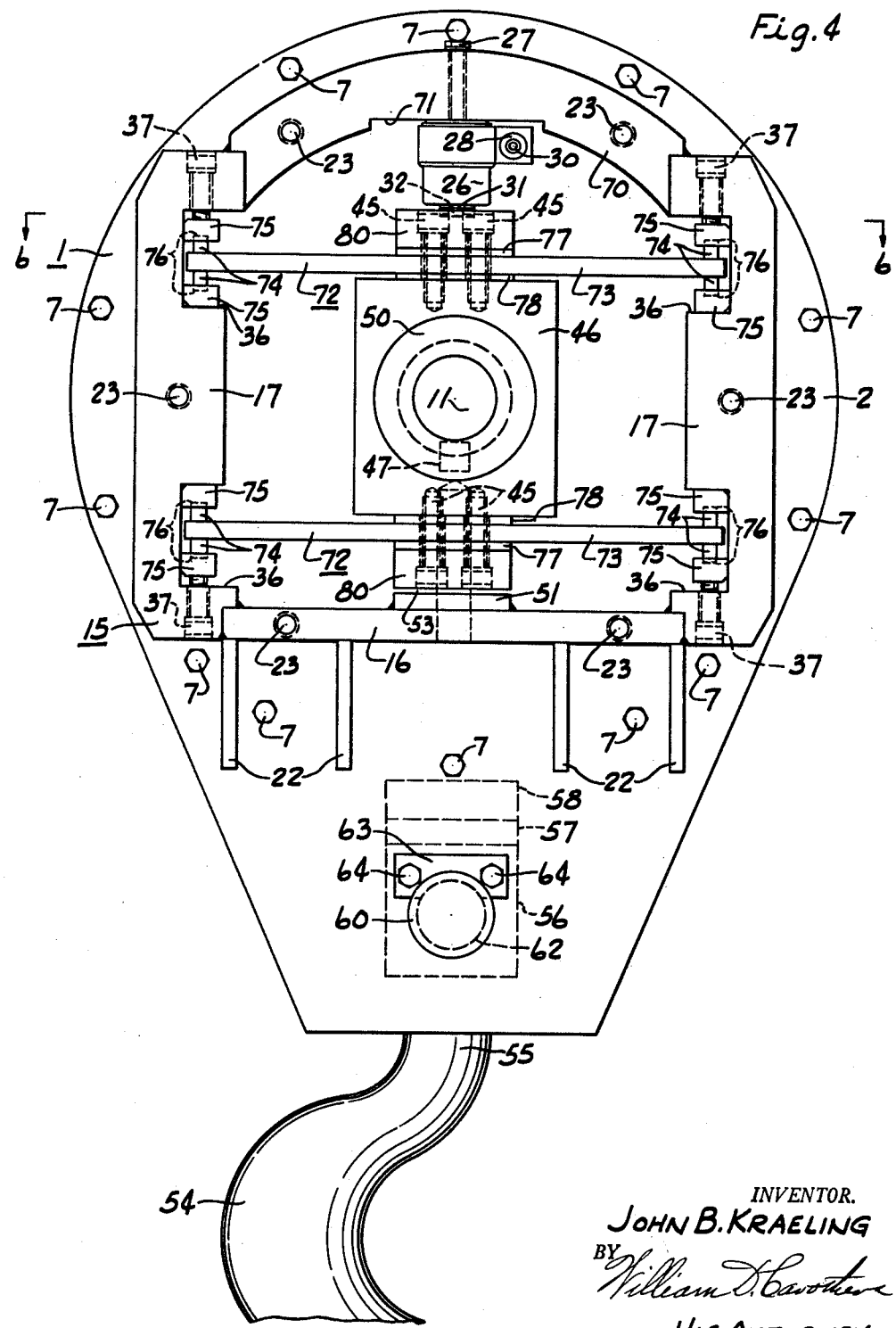
FIG. 4 is a view in side elevation of the traveling block comprising this invention with the cover plate removed and showing a modified form of load suspension.
Figure 5:
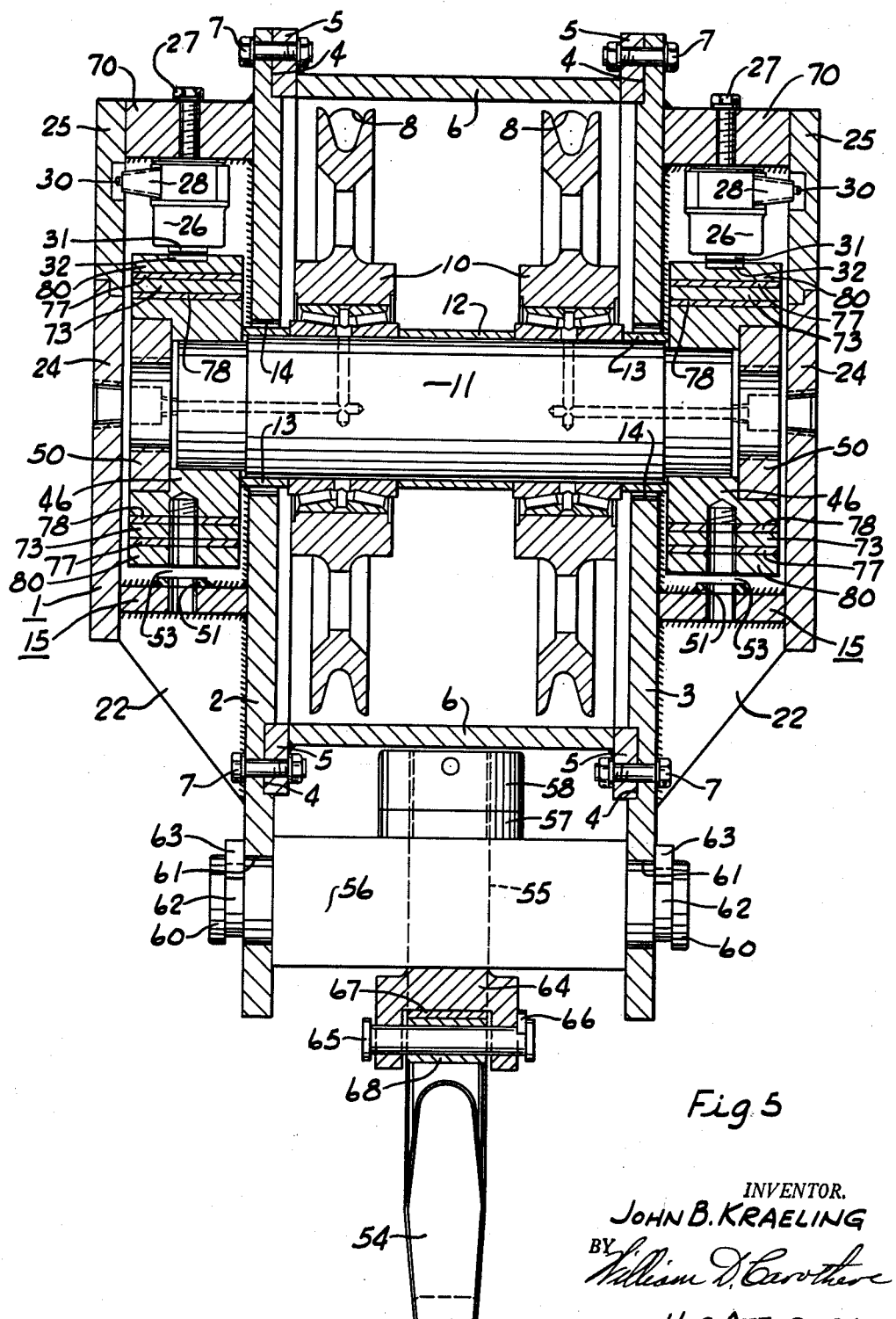
FIG. 5 is a view in vertical section of the traveling block as shown in FIG. 4.

Referring to FIGS. 1, 2 and 3 of the drawings the traveling block 1 comprises the side plates 2 and 3. Each of the side plates are heavy steel plates and are provided with an annular recess 4 to receive the annular feet 5 secured to the rim of the annular sheave guard 6. The feet 5 are welded to the annular sheave guard 6 as indicated and they represent flanges that pass completely around the traveling block and are secured thereto by the bolts 7 at least two of which in each side plate are bow bent to guide the position of the sheave guard and the balance of the bolts are ordinarily standard. This sheave guard thus secures the side plates 2 and 3 to each other and the recess 4 insures their interlocked position. The sides of the upper end of the annular guard 6 are provided with openings 8 for the passing of a cable line to each of the sheaves 10 which are mounted on antifrictional bearings the inner race of which is mounted on the sheave pin 11. The sheaves 10 have a central separating spacer sleeve and the end spacer sleeves 13 which support the inner race members in their proper position within the assembly. An ample clearance such as indicated at 14 is provided in each of the side plates 2 and 3 so that the sheave pin 11 and the spacer sleeves 13 may move within the side plates without engaging the same.

In the particular structure shown a weighing device is provided on each side of the traveling block and on the outer face of the plates. This being the preferred form. The weighing device in this instance is produced by the use of a load cell and a load cell housing 15 is secured to the outer face of each of the plates. As shown in FIG. 1 the housing 15 is fabricated by the heavy transverse lower member 16 connected by the side members 17 and 18 which are of different construction. The top of the housing 15 is constructed by the heavy sloping members 20 which connect the side members 17 and 18 with the keystone top member 21. Each of these members forming the load cell housing 15 are welded to the outer face of the plate preferably for their full length and on each side thereof and they are welded where they are joined together as shown. This housing is further reinforced by the triangular braces 22. These triangular braces are likewise welded on each side for their full engagement with the side plates and with the parts of the load cell housing 15 that they engage. A series of threaded openings 23 in the members forming the load cell housing 15 are employed to secure a cover plate 24 which completely encloses the load cell housing and may be provided with a gasket for the purpose of keeping the dirt from entering the housing.

The upper portion of the cover plate 24 as indicated at 25 is removable independently for the purpose of removing or connecting the load cells 26. The load cells 26 are secured in position by the core bolts 27 which extend through the blocks 21 into the load cell. The load cell is provided with an insulator 28 the outer end of which is provided with a connection wire 30 employed to conduct the current through the cell which is calibrated in accordance with the compression thereof to accurately determine the weight suspended on the traveling block. Each load cell 26 is provided with a load cell button 31 at the lower end thereof which engages the hardened insert 32 mounted in the center of the stabilizing bars or beam members 33 which in the preferred structure shown is provided with two of such beams. As shown in FIGS. 1, 2 and 3 the stabilizing bars or beam members 33 have a head 34 at their right ends which is a fixed head being secured by four cap screws 35 to the member 17. This head rests in the pocket 36 and is clamped down by the cap screw 37. Thus the beams 33 on both sides of the traveling block are rigidly secured by their heads 34 to the load cell housing. It is important that the heads 34 be at the same end of the traveling block on both sides of the same.

The opposite ends of the stabilizing bars or beam members 33 are provided with the rounded head members 38 which have a point contact on the hardened steel insert plates 40 in the pockets 41 of the load cell housing section 18. These rounded heads 38 have a clearance with the top of the pockets 41 and with the inner wall of the pockets 41 as shown in FIG. 1. Thus any movement of the beams 33 vertically permits the heads 38 to slide on the hardened inserts 40 to compensate for such arcuate movement about the fixed heads 34.

Each of the beam structures 33 have a relatively thin section 42 and a heavier section 43. This permits the thinner section 42 to flex whereas the heavier section 43 which is approximately twice the thickness of the thin section 42 is not apt to flex as much.

The sections 42 and 43 of each of the beams are joined to the central head or clamping block 44 which are secured by the cap screws 45 to the sheave pin yoke 46. The sheave pin yoke 46 is keyed to reduced ends of the sheave pin 11 as indicated by the key member 47. Thus each of the central head blocks 44 are secured rigidly to the sheave pin yoke 46. To further increase the rigidity of this connection the head blocks 44 have a central lug 48 that extends into a corresponding seat 49 in the upper and lower surfaces of the sheave pin yoke 46.

The load cell structure and the stabilizing beams on both sides of the traveling block are identical and are accurately positioned relative to each other so as to provide uniform characteristics between the two load cells 26 at opposite ends of the sheave pin 11.

A sheave pin lock nut 50 having an internal thread is inserted in a counterbore of each of the sheave pin yokes 46.

Below the central head 44 of the lower stabilizing beam 33 a stop block 51 is provided and is held in place by the cap screws 52 to provide a clearance 53 which represents the ultimate travel of the stabilizing bar assembly and represents the total compression under which the assembly can travel until the load is transmitted directly to the block 51. Thus the clearance 52 represents the limit of the downward travel of this sheave pin assembly.

By electrically connecting the two load cells 26 with an appropriate circuit to supply current therethrough any load suspended on the hook may be calibrated to directly read in the cab of the crane operator or elsewhere to determine at all times the character of load that is being handled.

In the hook assembly as shown in FIG. 1 the hook member 54 is mounted on a stem 55 which is rotatably supported in the hook beam 56 by means of the roller thrust bearing 57 held by the hook nut 58. The opposite ends of the hook beam 56 are reduced as indicated at 60 so that they may be journaled in the openings 61 of the plates 2 and 3. These reduced sections are provided with an annular slot 62 in which the keeper plate 63 is set and held by the bolts 64 for the purpose of securing the hook beam 56 in place.

In the structure shown in FIG. 2 the lower part of the stem 55 is provided with a clevis 64 which is provided with a hook pin 65 likewise held in place by keeper plate 66 at one end thereof. The hook member 54 is provided with a hook bearing housing 67 lined with the bearing 68. Thus the hook member may swing on the axis of the hook beam 56 or in the axis of the hook pin 65 and the stem 55 of the hook is enabled to rotate on a vertical axis.

The traveling block 1 is substantially the same as that shown in FIGS. 1, 2 and 3. However, the housing 15 on each side of the block is provided with the two side members 17 having subjacent pockets 36 which sides are connected at the top by the arched member 70 which takes the place of the sloping members 20 and the keystone member 21 of the previously described structure. The under side of the member 70 is provided with a seat 71 to receive the upper end of the load cell 26.

The side members 17 and the door member 16 are interlocked and welded on both sides to the plates 2 and 3. Thus the member 70 could be substituted in the structure previously described. However, the side members 17 are necessary to the support of the beam structures 72 which in this instance are constructed of the spring members 73 that extend from the pocket 36 of one side member 17 to the pocket 36 of the side member 17 on the opposite side of the sheave pin 11. These spring members 73 of course are of less length than the depth of the opposed pockets 36 as shown by the clearance between the ends of the springs and the pockets 36.

Each spring is supported by a clamp spacer 74 which is preferably made of any suitable material having a low modulus of elasticity. Material of this kind permits deformation within its elastic limit and allows movement of the spring or beam member relative to the support without any sliding action and thus functions in a manner similar to that of a free end beam. A low modulus material such as aluminum, copper and a strong thermosetting resin may be employed for this purpose. However, hardened aluminum which has been heat treated to give it a higher tensile strength and hardness will permit the beam member to move within the elastic limit of the hardened aluminum but without relative movement between the surfaces of the spacers and spring. The aluminum actually is deformed within its elastic limits allowing such movement. Thus the spacer blocks 74 are made of sufficient area so that they may withstand the clamping pressure of the clamp screws 37 without crushing or deforming the material beyond its elastic limit. A backup pressure clamp block such as the metal blocks 75 are provided with sockets or indentations 76 to receive the block 74 the opposite face of which engages the face of the beams 73. As shown in FIG. 6 the blocks 74 are preferably the same width as the ends of the beam which they clamp. Thus the opposite ends of the beams 73 are rigidly clamped in the side members 17 by the screws 37 and any movement of the beam 73 laterally is within the elastic limit of the clamp spacers 74.

The intermediate or central portion of each beam 73 is clamped in substantially the same manner as the structure previously stated with the aluminum clamp spacer members 77 and 78 mounted on opposite faces of the beam member 73 and held in place by the cap block 80 with the clamp screws 45. The clamp screws 45 enter the upper and lower faces of the pin yoke 46 carrying the pin 11.

I claim:

1. A traveling block weighing device comprising a housing having a centrally disposed sheave chamber and a load hook, a load cell mounted on each side of said housing with its pressure applicating button facing downwardly, horizontally disposed flexible stabilizing bar means under each load cell with their opposite ends supported by said housing and their intermediate portions free and engaging said pressure applicating buttons, a sheave carrying pin rotatably supporting sheaves in said sheave chamber and having its ends secured to said intermediate free portions of said horizontally disposed stabilizing bar means and wholly supported thereby, said sheave pin being free of said housing.

2. The traveling weighing device of claim 1 characterized in that each of said stabilizing bar means has one end fixed to said housing and the other end slidably supported on said housing, said fixed ends being on the same side of said sheave pin.

3. The traveling weighing device of claim 2 characterized in that each of said stabilizing bar means has a thinner section adjacent its fixed end and a thicker section on the other end.

4. A traveling block weighing device comprising a housing having a centrally disposed sheave chamber and a load hook, a load cell mounted on each side of said housing with its pressure applicating button facing downwardly, horizontally disposed stabilizing bar means under each load cell with their opposite ends supported by said housing and their intermediate portions free and engaging said pressure applicating buttons, a sheave carrying pin rotatably supporting sheaves in said sheave chamber and having its ends secured to said intermediate free portions of said horizontally disposed stabilizing bar means, said sheave pin being free of said housing, and each of said stabilizing bar means comprises two beams with one secured to the top and the other to the bottom of the ends of said sheave pin.

5. The traveling weighing device of claim 1 characterized by a stop on said housing below the sheave pin and the free portion of each stabilizing bar means to limit the vertical movement of the same.

6. A traveling block weighing device comprising a housing having a centrally disposed sheave chamber and a load hook, a load cell mounted on each side of said housing with its pressure applicating button facing downwardly, horizontally disposed stabilizing bar means under each load cell with their opposite ends supported by said housing and their intermediate portions free and engaging said pressure applicating buttons, a sheave carrying pin rotatably supporting sheaves in said sheave chamber and having its ends secured to said intermediate free portions of said horizontally disposed stabilizing bar means, said sheave pin being free of said housing, and each of said stabilizing bar means comprises leaf spring, hard aluminum clamp spacer on each leaf spring face, and clamp menas to secure said spacers and the ends of said springs to said housing and their intermediate free portions to said sheave pin ends.

7. The traveling weighing device of claim 6 characterized in that said stabilizing bar means on each side of said housing comprises two sets of leaf springs with their hard aluminum clamp spacers at their intermediate free portions secured to the top and bottom of said sheave pin and with their hard aluminum clamp spacers at their ends secured to said housing.

8. The traveling weighing device of claim 1 characterized in that said load hook includes a hook beam having its ends secured to said housing, a stem extending through said load beam and supported by a roller thrust bearing, a clevis on the bottom of said stem, a hook pin supported on said clevis and a hook journaled on said hook pin.

9. The traveling weighing device of claim 1 characterized by a pair of spaced vertical plates having aligned clearance openings through which to pass said sheave pin, an annular recess in the adjacent sides of said plate, an annular sheave guard having a foot flange at each end to fit said recesses, said sheave guard having openings to pass cables to the sheaves, and fastenings means to secure said flanges in said recesses.

References Cited in the file of this patent

UNITED STATES PATENTS

| | | |
|---|---|---|
| 2,786,669 | Safford et al. | Mar. 26, 1957 |
| 2,793,851 | Ruge | May 28, 1957 |
| 2,820,624 | Koegel | Jan. 21, 1958 |